(12) United States Patent
Schäfer et al.

(10) Patent No.: US 6,318,927 B1
(45) Date of Patent: Nov. 20, 2001

(54) FIXING SYSTEM COMPRISING A PLASTIC COVERED SCREW

(75) Inventors: Burkhard Schäfer, Ganderkesee; Stephan Klumpe, Ostercappein; Thomas Rauterberg, Bremen; Herniu Michalski, Brinkum, all of (DE)

(73) Assignee: Nacam Deutschland GmbH (DE)

( * ) Notice: Subject to any disclaimer, the term of this patent is extended or adjusted under 35 U.S.C. 154(b) by 0 days.

(21) Appl. No.: 09/462,766
(22) PCT Filed: May 21, 1998
(86) PCT No.: PCT/DE99/01398
  § 371 Date: Mar. 21, 2000
  § 102(e) Date: Mar. 21, 2000
(87) PCT Pub. No.: WO99/58864
  PCT Pub. Date: Nov. 18, 1999

(30) Foreign Application Priority Data

May 11, 1998 (DE) ................................ 196 12 160

(51) Int. Cl.[7] .................................... F16B 39/34
(52) U.S. Cl. .................. 403/408.1; 403/11; 403/209; 411/903
(58) Field of Search ..................... 411/174, 175, 411/903, 908, 999; 403/296, 408.1, 291, 320, 206, 209, 11–12

(56) References Cited

U.S. PATENT DOCUMENTS

| | | | |
|---|---|---|---|
| 2,382,942 | * 8/1945 | Murphy | 411/174 |
| 3,313,017 | * 4/1967 | Zingali | 411/903 X |
| 3,568,746 | 3/1971 | Faroni | . |
| 3,875,661 | * 4/1975 | Lidstrom et al. | 411/174 X |
| 4,674,931 | * 6/1987 | Schwind et al. | 411/175 |
| 4,815,907 | * 3/1989 | Williamson et al. | 403/408.1 X |
| 4,850,633 | * 7/1989 | Emery | 411/174 X |
| 4,897,005 | * 1/1990 | Peterson et al. | 411/174 X |
| 5,306,091 | * 4/1994 | Zaydel et al. | 411/175 |
| 5,713,707 | * 2/1998 | Gagnon | 411/174 X |
| 5,924,813 | * 7/1999 | Sasaki | 403/408.1 X |

FOREIGN PATENT DOCUMENTS 40 15 72 C1  10/1991  (DE) .
0 508 135 A1  10/1992  (EP) .

* cited by examiner

*Primary Examiner*—Harry C. Kim
(74) *Attorney, Agent, or Firm*—McGlew and Tuttle, P.C.

(57) ABSTRACT

A fastening system is provided for fastening a first structural component to a second structural component for use especially in the motor vehicle industry, which has at least one fastening screw, a corresponding first preassembly thread on the first structural component, in which the fastening screw is fastened after the preassembly and a fastening thread on the first structural component or the second structural component for fixing the first structural component to the second structural component by the fastening screw, whereby this screw, after fixing, is fastened in the associated fastening thread, whereby the fastening screw has at least one front threaded area arranged on the free end of the screw shank and a second area adjacent to the screw head, whereby this is provided with a plastic coating, into which a thread corresponding to the preassembly thread is incorporated only when the fastening screw is screwed into the preassembly thread.

14 Claims, 3 Drawing Sheets

FIXING SYSTEM COMPRISING A PLASTIC COVERED SCREW

FIELD OF THE INVENTION

The present invention pertains to a fastening system for fastening a first structural component to a second structural component for use especially in the motor vehicle industry, and more particularly to a fastening system which has at least one fastening screw, a corresponding first preassembly thread on the first structural component, in which the fastening screw is fastened after the preassembly and a fastening thread on the first structural component or the said second structural component for fixing the first structural component to the second structural component by means of the fastening screw, whereby the said fastening screw, after fixing, is fastened in the associated fastening thread and has at least one front threaded area arranged on the free end of the screw shank and a second area adjacent to the screw head.

BACKGROUND OF THE INVENTION

A fixing device for a cap screw as a fastening screw has become known from DE-GM 18 20 586. A flange can be fastened to a structural component by means of this fastening screw. At least one hole with a preassembly thread is provided in the flange. The fastening screw has a shank area between the head and the threaded area, whereby the length of the threaded area for fastening the fastening screw is dimensioned such that this screw leaves the preassembly thread to be traversed within the framework of the preassembly before the screwing-in process in the fastening thread begins. In this case, the thread inner diameter of the fastening screw corresponds to the outer diameter of the shank area, as a result of which the loss protection of the fastening screw is realized. This means that the fastening screw is only held in the hole by the small threaded area in case of the solution according to DE-GM 18 20 586.

Also, a necked-down screw, which is used to seal a threaded hole, is disclosed in DE 15 30 27 417 A1. The shank area of this fastening screw is provided with a coating made of elastomer material, whose outer diameter corresponds to the outer diameter of the thread. An exclusively elastic, that is, reversible deformation of the elastomer material should take place during the screwing in.

The fastening systems of the type mentioned in the introduction are also used, for example, to fasten preassembled structural components, such as steering column modular units, or the like, to the body of a motor vehicle within the framework of the final assembly. In this case, in the preassembly of a steering column modular unit, one or more fastening screws are each screwed into a preassembly thread which is preferably fastened to the housing of the steering column modular unit. This has the advantage that, in the final assembly of the steering column modular unit to the body, no individual fastening structural elements have to be additionally provided. If the steering column modular unit is brought into its final position during the final assembly to the body, then the fastening screws are screwed into a second fastening thread. This fastening screw may be located both directly on the body structure of a motor vehicle and/or likewise as an extension of the preassembly thread on the steering column housing. In the latter case, the steering column modular unit is clamped by means of a bracket on the body side, which is arranged between the preassembly thread and the fastening thread. Both forms of fastening make it necessary that the fastening screw with its thread must have left either the preassembly thread before the screw enters the fastening thread with its first turns, or the preassembly thread is broken over, i.e., destroyed, during the entry of the fastening screw into the fastening thread.

Both assembly variants described have a serious drawback in terms of a possible disassembly of the steering column modular unit again.

The variant mentioned first, in which the fastening screw came completely out of the preassembly thread, results in the difficulty that a loosening of the fastening screw means inevitably a return of the screw into the first preassembly thread. In the usually only possible introduction of a pressing power in the longitudinal axis of the screw, this return is very difficult and is almost entirely ruled out under normal disassembly conditions. This means that the disassembly of the steering column is possible only with special difficulties.

In the second of the variants described above the preassembly thread is already often almost entirely destroyed after the initial assembly of the steering column. This means that, after a disassembly of the steering column, this thread must be rethreaded, since it is no longer usable, and as a result, the steering column is limited in its ability to be assembled.

SUMMARY AND OBJECTS OF THE INVENTION

Therefore, the object of the present invention is to eliminate the above-described drawbacks of the state of the art as well as to provide a fastening system that guarantees a problem-free assembly and disassembly of a component or a structural component to a second component and at the same time can be handled in a problem-free manner and can be produced at a favorable cost.

According to the invention, the fastening screw has at least one front threaded area arranged on the free end of the screw shank and a second area adjacent to the screw head, whereby this screw is provided with a plastic coating, into which a thread corresponding to the preassembly thread is incorporated only when screwing the fastening screw into the preassembly thread.

This special design causes, during the screwing and unscrewing process of the fastening screw, this fastening screw to be able to be screwed with its front threaded part in the corresponding fastening thread, in which case at the same time first the fastening screw is guided by the plastic-coated area during the screwing-in process and at the same time during the tightening process an overwinding of the thread impressed in this plastic-coated area is possible. This overwinding prevents a damage to the preassembly thread at the first structural component and makes possible a problem-free removal of the fastening screw from the fastening thread and preassembly thread. Moreover the adhesion between the plastic coating and the preassembly thread after completion of the process of tightening the fastening screw forms an additional prevention against unintentional loosening of the fastening screw. Another advantage of the fastening system according to the present invention lies in the fact that, after a disassembly cycle, only one new fastening screw must be used for a reassembly, which means a considerable cost savings compared with the state of the art.

It proved to be especially advantageous to make the plastic coating from a ductile, plastic material, and preferably polyethylene or polyurethane. These materials offer the guarantee that the so-called overwinding moment within the preassembly thread during the process of tightening the fastening screw lies within a range of 2 to 6 Nm and thus affects the actual tightening moment only extremely slightly. Moreover the special ductility of the materials offers the guarantee that the plastic material can yield during the overwinding of the fastening screws in the turns of the preassembly thread and thus only minimal material shearing occurs.

Furthermore, it proved to be advantageous that the length of the first threaded area of the fastening screw used for fastening is dimensioned such that this screw leaves the preassembly thread to be traversed within the framework of the preassembly before the screwing-in process in the fastening thread begins. This special design form facilitates the "threading" of the front threaded area into the fastening thread during the process of screwing in the fastening screw.

In addition, it is advantageous to arrange, in the area of the plastic coating, a circumferential screw knurl radially between the screw shank and plastic coating of the fastening screw. This screw knurl increases the adhesive force of the plastic coating at the shank area of the fastening screw provided for this. Therefore, this is especially important since the fastening screws are usually tightened by means of compressed-air screws, which operate at high speeds and high torques.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
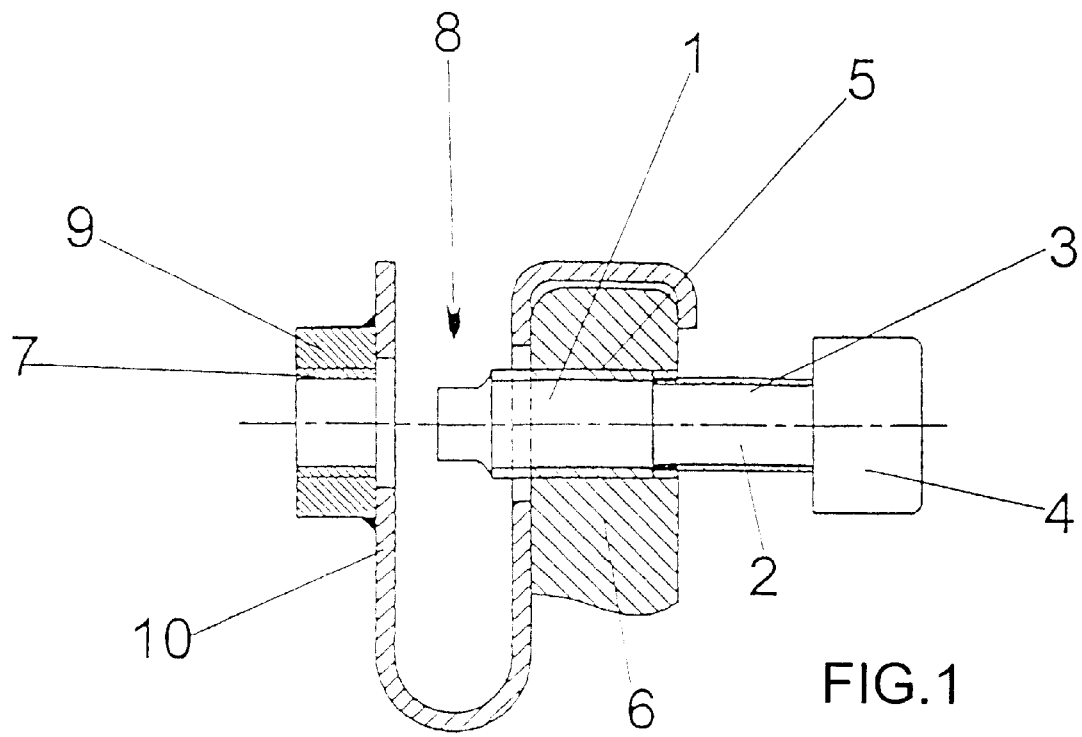
FIG. 1 is a sectional view of an embodiment of the fastening system according to the present invention in the preassembled state of the fastening screw.
Figure 2:
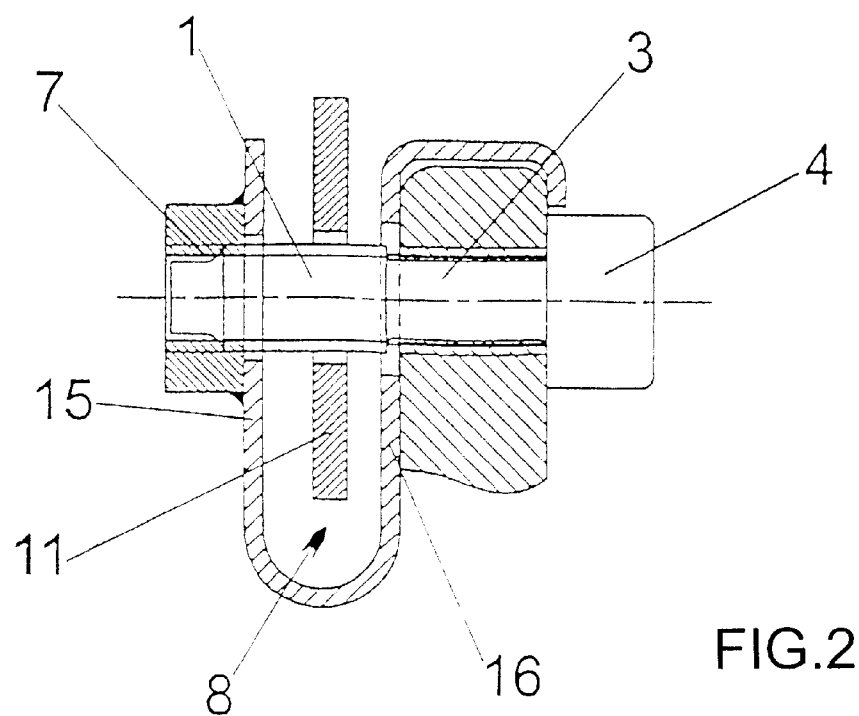
FIG. 2 is the fastening system according to the present invention of FIG. 1 in an intermediate stage of fastening.
Figure 3:
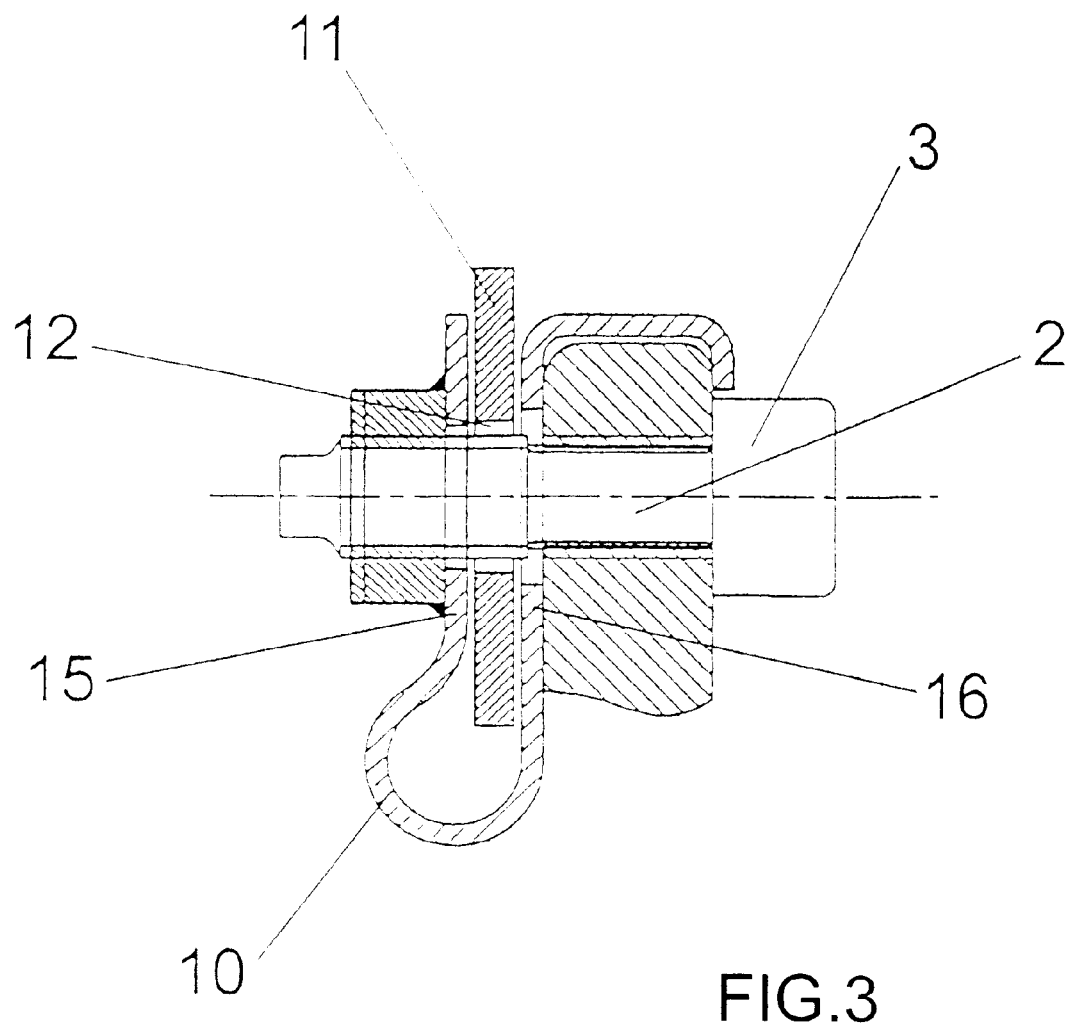
FIG. 3 is the fastening system according to the present invention from FIG. 1 in the final-assembled state.

Referring to the drawings in particular, the fastening system shown in FIGS. 1 to 3 has a fastening screw 3, which is provided with a first threaded area 1 arranged on the front free end of the shank. Adjacent to the threaded area 1 is found a plastic-coated shank area 2 that extends from the end of the threaded area 1 over the entire shank up to the screw head 4 of the fastening screw 3. The fastening system also includes a preassembly thread 5 that is arranged in a housing component 6 of a structural component to be assembled, e.g., a steering column modular unit. In addition, the fastening system has a second fastening thread 7, which lies axially in alignment with the preassembly thread 5 and is separated from this thread by a gap 8. The fastening thread 7 is found in a weld nut 9, which is welded to a U-shaped hoop 10, which is in turn fastened to the above-mentioned housing component 6. The preassembly state of the steering column modular unit provides that the fastening screw 3 is screwed with its threaded area 1 into the preassembly thread 5 of the housing component 6, as is shown in FIG. 1. Within the framework of the final assembly of the steering column modular unit within a motor vehicle, the steering column modular unit is brought into a position, in which a bracket 11 on the car body side engages in the gap 8, which is formed by the two sides 15 and 16 of the U-shaped hoop 10 During the final assembly, the fastening screw 3 is guided through a recess 12 in the bracket 11, in which case the recess 12 may have, e.g., the form of a slit or a hole.

FIG. 2 shows an intermediate stage, in which the fastening screw 3 is screwed with its threaded area 1 into the first turns of the fastening thread 7. At the same time, a thread is cut through by the preassembly thread 5 by the screwing motion of the fastening screw 3. The preassembly thread 5 is impressed into the shank area 2 into the plastic coating present there. This thread in shank area 2 (the thread impressed by the preassembly thread 5) provides a guiding function. It is clear from FIG. 2 that the threaded area 1 is dimensioned in its length such that this threaded area 1 is released from the preassembly thread 5 with the screw head 4 arranged at the housing component 6. A further tightening of the fastening screw 3 causes, on the one hand, a reduction in the gap 8 due to the movement of the weld nut 9 towards the screw head 4. In addition, there is an overwinding of the thread formed during the screwing-in process (the thread impressed by the preassembly thread 5). This is an overwinding, relative to the thread impressed into the plastic coating, occurs in the shank area 2. This overwinding is made possible by the ductility of the plastic used, such as, e.g., polyethylene or polyurethane, which makes it possible for the plastic material applied to the shank area 2 to yield in the turns present. Depending on the material properties of the plastic, the torque needed for the yielding of the material may be affected, whereby, in the selection of the material, above all else, a smallest possible torque is sought, since, as a result of this, there is a direct effect on the clamping force of the bracket 11 of the body between the two sides 15 and 16 of the housing component 6.

Thus, the plastic coating makes it possible with the screw head 4 arranged at the housing component 6 for the fastening screw to be able to be further turned without translational motion, while the weld nut shifts in a translational manner on the first threaded area 1.

FIG. 3 shows the state of final assembly of the fastening system. In this case the bracket 11 of the car body is clamped between the sides 15 and 16 of the hoop 10, whereby the hoop 10 has deformed according to the view of FIG. 3. In this state of the fastening system, the adhesion of the plastic coating at the preassembly thread 5 offers an additional protection against unintentional loosening of the fastening screw 3.

In a disassembly of the steering column modular unit, the plastic coating is, moreover, able to guide the fastening screw 3 in the manner necessary during unscrewing. The fastening system shown thus makes possible a simple assembly and disassembly of structural elements that are to be connected. Compared to the state of the art the preassembly thread 5 according to the present invention remains undamaged during the assembly and disassembly process, and only the fastening screw 3, as a less expensive component, is to be replaced after a disassembly.

Figure 4A:
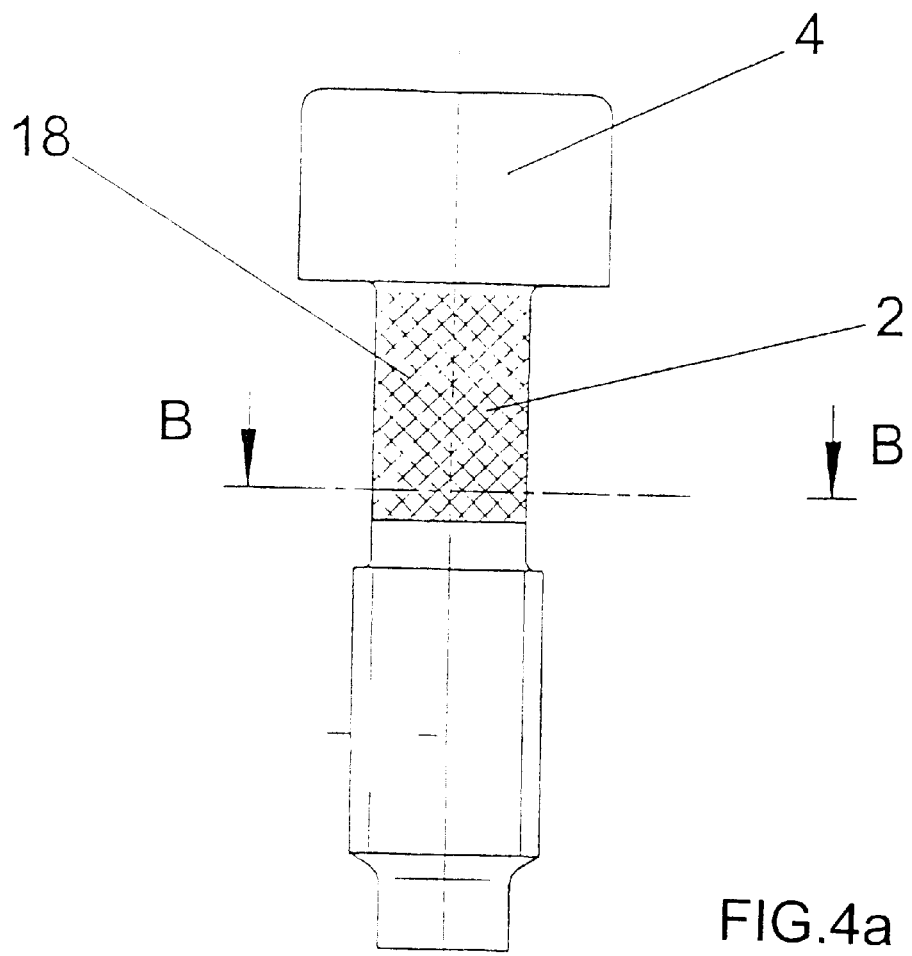
FIG. 4a is a lateral view of a fastening screw of the fastening system according to the present invention.
Figure 4B:
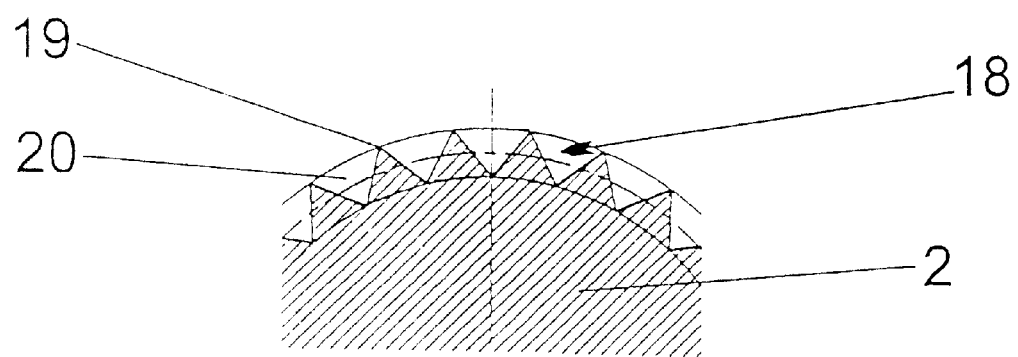
FIG. 4b is a section of the fastening screw corresponding to FIG. 4b, 4a along the sectional line B/B in this figure.

A possible embodiment of a screw knurl 18 in the shank area 2 of the fastening screw 3 is shown in FIGS. 4a and 4b. This screw knurl 18, which is shown as an axial and circumferential knurl in FIGS. 4a and 4b, serves to provide an improved support of the plastic coating applied in the shank area 2. To make the screw knurl clear, the plastic coating is not shown in FIGS. 4a and 4b.

It is especially evident from FIG. 4b that the screw knurl 18 has a zigzag-shaped form around the shank area 4 with points 19 projecting outwards and depressions 20 arranged between the points 19. Both the points 19 and the depressions 20 are dimensioned at an angle of preferably 45° to the longitudinal axis of the screw so that it completely fills in the depressions 20 between the points 19 and a sufficient layer thickness for inserting the preassembly thread is present radially on the outer surface of the shank area.

While specific embodiments of the invention have been shown and described in detail to illustrate the application of the principles of the invention, it will be understood that the invention may be embodied otherwise without departing from such principles.

APPENDIX

List of reference numbers:
1. threaded area
2. shank area
3. fastening screw
4. screw head
5. preassembly thread
6. housing component
7. fastening thread
8. gap
9. weld nut
10. hoop
11. bracket
12. recess
15. side
16. side
18. screw knurl
19. point
20. depression

What is claimed is:

1. A first structural component to a second structural component fastening system, the system comprising:
   at least one fastening screw with a screw head and a screw shank having a free end threaded area and a plastic coating area with a plastic coating extending from said threaded area to a location adjacent to said screw head;
   a preassembly thread on the first structural component, said fastening screw threaded area being engageable with said preassembly thread to form a preassembly;
   a fastening thread on the first structural component or on the second structural component, said threaded area being engageable with said fastening thread to form a final assembly, said plastic coating engaging said preassembly thread on the first structural component as said threaded area of said fastening screw is moved from engagement with said preassembly thread to engagement with said fastening thread, with said preassembly thread being impressed into said plastic coating to guide said fixing screw between engagement with said preassembly thread to engagement with said fastening thread.

2. The fastening system according to claim 1, wherein said plastic coating is made from a ductile material.

3. The fastening system according to claim 2, wherein said plastic coating is made from one of polyethylene and polyurethane.

4. The fastening stem according to claim 1, wherein said threaded area of said fastening screw has an axial dimension such that said threaded area disengages said preassembly thread before engaging said fastening thread as said fastening screw is moved between a position of said preassembly and a position of said final assembly and said plastic coating area is engaged by said preassembly thread.

5. The fastening system according to claim 1, wherein a circumferential screw knurl surface is arranged below said plastic coating of said fastening screw.

6. The fastening system according to claim 1, wherein an axial and circumferential knurl is arranged radially below said plastic coating of said fastening screw.

7. The fastening system according to claim 1, wherein said threaded area and said plastic coating area of said fastening screw have axial dimensions such that only said plastic coating area engages said preassembly thread upon said threaded area engaging said fastening thread.

8. A first structural motor vehicle component to a second structural motor vehicle component fastening system, the system comprising:
   a fastening screw with a screw head, and a shank having a free end, said fastening screw having a threaded area arranged on said shank adjacent to said free end and said shank having a plastic coating area adjacent to said threaded area and adjacent to said screw head, said plastic coating area being provided with a plastic coating;
   a preassembly thread defined by the first structural motor vehicle component, said fastening screw being fastened in said preassembly thread to form a preassembly, said fastening screw threaded area fixing the first structural motor vehicle component to the second structural motor vehicle component via a fastening thread associated with the first structural motor vehicle component or the second structural motor vehicle component to form a final assembly, said preassembly thread being impressed into said plastic coating upon said fastening screw being screwed from a preassembly position to a final assembly position.

9. The fastening system according to claim 8, wherein the plastic coating is made from a ductile material.

10. The fastening system according to claim 9, wherein the plastic coating is made from one of polyethylene and polyurethane.

11. The fastening system according to claim 8, wherein said threaded area of said fastening screw has an axial dimension such that said threaded area disengages said preassembly thread before engaging said fastening thread as said fastening screw is moved between a position of said preassembly and a position of said final assembly and such that only said plastic coating area engages said preassembly thread upon said threaded area engaging said fastening thread.

12. The fastening system according to claim 8, wherein a circumferential screw knurl surface is arranged below said plastic coating of said fastening screw.

13. The fastening system according to claim 8, wherein an axial and circumferential knurl is arranged radially below said plastic coating of said fastening screw.

14. The fastening system according to claim 8, wherein sad threaded area and said plastic coating area of said fastening screw have axial dimensions such that only said plastic coating area engages said preassembly thread upon said threaded area engaging said fastening thread.

* * * * *